(12) United States Patent
Staack et al.

(10) Patent No.: US 8,176,184 B2
(45) Date of Patent: May 8, 2012

(54) METHOD AND SYSTEM PROVIDING A MESSAGING SERVICE

(75) Inventors: Jens Staack, Helsinki (FI); Petri Koskelainen, Espoo (FI)

(73) Assignee: Nokia Corporation, Espoo (FI)

( * ) Notice: Subject to any disclaimer, the term of this patent is extended or adjusted under 35 U.S.C. 154(b) by 237 days.

(21) Appl. No.: 12/153,680

(22) Filed: May 22, 2008

(65) Prior Publication Data

US 2008/0228892 A1 Sep. 18, 2008

Related U.S. Application Data

(63) Continuation of application No. 10/332,574, filed as application No. PCT/EP00/06708 on Jul. 13, 2000, now Pat. No. 7,756,979.

(51) Int. Cl.
*G06F 15/16* (2006.01)
*G06F 15/173* (2006.01)

(52) U.S. Cl. ......... 709/227; 709/204; 709/206; 709/224

(58) Field of Classification Search .......... 709/203–207, 709/223–224
See application file for complete search history.

(56) References Cited

U.S. PATENT DOCUMENTS

| | | | |
|---|---|---|---|
| 4,468,813 A | 8/1984 | Burke et al. | |
| 5,732,219 A | 3/1998 | Blumer et al. | |
| 5,964,831 A | 10/1999 | Kearns et al. | |
| 5,983,366 A | 11/1999 | King | |
| 6,185,599 B1 | 2/2001 | Salimando et al. | |
| 6,216,165 B1 * | 4/2001 | Woltz et al. | 709/232 |
| 6,260,148 B1 | 7/2001 | Aggarwal et al. | |
| 6,438,215 B1 * | 8/2002 | Skladman et al. | 379/67.1 |
| 6,510,454 B1 | 1/2003 | Walukiewicz | |
| 6,640,241 B1 | 10/2003 | Ozzie et al. | 709/204 |
| 6,747,970 B1 * | 6/2004 | Lamb et al. | 370/352 |
| 6,757,732 B1 * | 6/2004 | Sollee et al. | 709/227 |
| 6,978,293 B1 * | 12/2005 | Wong et al. | 709/207 |
| 7,209,955 B1 * | 4/2007 | Major et al. | 709/207 |

(Continued)

FOREIGN PATENT DOCUMENTS

| | | |
|---|---|---|
| EP | 0 833 532 A2 | 4/1998 |
| WO | WO 97/47121 | 12/1997 |
| WO | WO 98/00787 | 1/1998 |
| WO | WO 98/09421 | 3/1998 |
| WO | WO 00/69140 A1 | 11/2000 |

OTHER PUBLICATIONS

3G TS 23.040; V3.4.1 (Apr. 2000), 3$^{rd}$ Generation Partnership Project; Technical Specification Group Terminals; Technical realization of the Short Message Service (SMS); (Release 1999).

(Continued)

*Primary Examiner* — Joshua Joo
(74) *Attorney, Agent, or Firm* — Ditthavong Mori & Steiner, P.C.

(57) ABSTRACT

The invention is directed to a instant messaging method and communication system comprising one or more network elements, wherein a connection from one to another network element can be established using a protocol which allows the sending of one or more messages from the one to the another network element as part of one or more protocol words. The protocol includes a protocol portion allowing a network element to specify whether or not the message is to be stored in case it cannot be promptly delivered to the another network element. The protocol portion preferably is part of the protocol header. The protocol may be a Session Initiation Protocol (SIP), and the message can be contained in an Invite request sent from the sending equipment to the receiving equipment.

30 Claims, 6 Drawing Sheets

U.S. PATENT DOCUMENTS

| | | | |
|---|---|---|---|
| 7,392,281 | B1 | 6/2008 | Kanojia et al. .................. 709/202 |
| 7,680,887 | B2 | 3/2010 | Kiss et al. |
| 2002/0021307 | A1* | 2/2002 | Glenn et al. .................... 345/753 |
| 2002/0065894 | A1* | 5/2002 | Dalal et al. ..................... 709/206 |
| 2002/0173308 | A1* | 11/2002 | Dorenbosch et al. .......... 455/435 |
| 2004/0093387 | A1 | 5/2004 | Wick ............................. 709/207 |
| 2004/0172483 | A1* | 9/2004 | Horvitz ......................... 709/240 |
| 2005/0114533 | A1* | 5/2005 | Hullfish et al. ................ 709/230 |
| 2006/0242246 | A1* | 10/2006 | Lyle et al. ..................... 709/206 |
| 2009/0125591 | A1* | 5/2009 | Kirkpatrick ................... 709/206 |

OTHER PUBLICATIONS

Handley et al.; RFC 2543, "SIP Session Initiation Protocol", Network Working Group, Category: Standards Track; Mar. 1999; pp. 1-3, 24-33, 37-70 (see specification).

Handley et al.; "SIP: Session Initiation Protocol", Internet Engineering Task Force, Internet Draft, draft-ietf-sip-rfc2543bis-00.txt; Jul. 13, 2000, Expires: Dec. 2000.

M. Day et al.; RFC 2778, "A Model for Presence and Instant Messaging", Network Working Group, Category: Informational; Feb. 2000.

M. Day et al.; RFC 2779; "Instant Messaging/Presence Protocol Requirements", Network Working Group, Category: Informational; Feb. 2000.

Schulzrinne H. et al., "Internet Telephony: Architecture and Protocols—an IETF Perspective", Computer Networks and ISDN Systems, North Holland Publishing, Amsterdam, NL, vol. 31, No. 3, Feb. 11, 1999, pp. 237-255, ISSN: 0169-7552.

Collesei P. et al., "SMS Based Applications for GSM Networks", CSELT Technical Reports, Torino, IT, vol. 23, No. 3, Jun. 1995, pp. 337-349, ISSN: 0393-2648.

* cited by examiner

METHOD AND SYSTEM PROVIDING A MESSAGING SERVICE

CROSS-REFERENCE TO RELATED APPLICATION

The present application is a continuation of U.S. patent application Ser. No. 10/332,574, which was filed on Mar. 26, 2003 now U.S. Pat. No. 7,756,979, under 35 USC 371, based on International Application PCT/EP00/06708, filed on Jul. 13, 2000. Priority of both of these application is claimed, and the entire contents of these application is hereby incorporated by reference.

FIELD OF THE INVENTION

The invention relates to a communication method and system implementing a messaging service

BACKGROUND OF THE INVENTION

Several networks provide messaging services which allow messages to be sent from one to another network terminal without necessity of actually initiating a call. For instance, a plurality of GSM networks support a short message service (SMS) which permits the transmission of short messages. A more recent development is the multimedia messaging service (MMS) which allows the transmission not only of text messages but also of pictures and the like. Both these SMS and MMS are store-and-forward messaging services which necessitate additional network elements (e.g. SMSC, Short Message Service Center) and dedicated protocols such as specified in ETSI TS 23.040.

Moreover, the Internet provides a direct user-to-user messaging for chatting or instant messaging (e.g. using Instant Messaging/Presence Protocol IMPP). Further, the Internet offers a store-and-forward messaging, e.g. e-mail service (POP3 "Post Office Protocol, version 3" or IMAP4 "Internet Message Access Protocol, Version 4").

Presently, some instant messaging services are either based on existing standards, or are proprietary solutions such as AOL instant messaging service. Some requirements of future instant messaging services are defined in IETF RFC 2778 and RFC 2779. The instant messaging service requests both sender and receiver to be on-line and registered to the instant messaging server. When the receiver is e.g. not reachable, no instant message can be delivered.

For establishing a bidirectional connection between a caller and a callee, several call control protocols such as SIP (Session Initiation Protocol, see e.g. RFC 2543 and RFC 2543bis) are proposed. SIP may not only be used as a call control protocol but also offers the possibility of being used as instant messaging service. For instance, the SIP INVITE message can be used to carry content payloads (MIME types such as JPEG) inside one protocol message without the need of actually setting-up a voice-over-IP (VoIP) call. Other SIP message types (e.g. INFO) may also be used and new message types may be defined for this purpose. Note that the INVITE message is a signalling message. As an example, a user A may include the following MIME-payloads into one INVITE message for the user B:
 image/jpeg (e.g. to send a picture)
 audio/midi (e.g. for playing a sound clip).
All such information fits into one SIP message.

FIG. 3 shows one example of using the INVITE message as a messaging possibility. The names and numbers of the messages shown in FIG. 3 are as defined in RFC 2543. First, user A sends an INVITE message (F1) to user B which message includes the payload. User B responds by returning "100 Trying" (F2), "180 Ringing" (F3), and "200 OK" (F4), which confirms receipt of the message. User A then sends a "BYE" message (F5), to user B which acknowledges this message by returning "200 OK" (F6).

SIP-based messaging provides the advantage of being usable without need of any new network elements and is therefore cheap, and may possibly replace other messaging services. However, for performing this SIP-based messaging, both sender and receiver must be "on-line", i.e. user B must be actually reachable.

SUMMARY OF THE INVENTION

The present invention aims at providing a messaging service which can easily be implemented without need of new network elements, and which offers enhanced messaging possibilities.

The present invention provides a method and/or system as defined in any one of the claims. Further, the invention provides network element adapted to perform the necessary functions.

In accordance with one aspect of the invention, the instant messaging service is enhanced by providing a storing capability for messages. When the intended receiver of the message is presently unable to receive the message because he is e.g. not on-line, busy and/or not reachable by the network, e.g. by the proxy server of the receiving user, because of any other reason, the message may be stored. This saving of the message enables its later delivery to the receiving user when this user is able to receive the message, e.g. after re-attachment to the network. No connection for bi-directional communication needs to be established.

The protocol normally used for initiating a connection enabling e.g. a bi-directional communication between a call originating equipment and a call terminating equipment thus serves the further purpose of indicating whether or not transmitted instant messages are to be stored in case of impossibility of direct delivery. The protocol allowing messages to be sent from the sending to the receiving equipment as part of the protocol, is amended so as to be able to include an identifier which may be or include a store command. The store command can be, in a preferred implementation a store-and-forward command. A serving network element trying to provide a connection to the receiving equipment in vain, is preferably adapted to check the protocol with respect to the inclusion of such an identifier representing a store command. When the store command is found, the message is not simply discarded but is stored in an appropriate place, such as in an own memory of this network element, or in a storage of another network element such as a server.

As the identifier can be included in the protocol, the message and the identifier (e.g. store command) can be transmitted in a unidirectional manner from the sending equipment to the serving network element provided for establishing connections to the receiving equipment. This feature significantly reduces the signalling and traffic load necessary for transmitting and handling messages. In addition, no new protocols for messaging are necessary, and the invention can be implemented in existing networks in an inexpensive manner. Furthermore, no new network elements are necessary for implementing the invention, so that the disclosed technique is easily and inexpensively deployable by a network operator or service provider. This messaging service structure may also replace existing messaging services and hence contribute to a harmonisation of messaging services.

The protocol preferably used is the Session Initiation Protocol SIP. The protocol comprises a portion allowing a network element, preferably the sending network element, to specify whether or not the message is to be stored, or stored-and-forwarded, by respectively setting or including the identifier. This protocol portion is preferably part of the protocol header. The message receiving element which may be the serving network element serving the presently unreachable receiving network element, is able to easily check the protocol header with regard to existence of such a store, or store-and-forward, command, and will decide on storing or discarding of the message depending on the command included in the protocol header (if any).

The message is preferable sent in an INVITE request or in other SIP request sent from the sending to the receiving equipment.

When the command is a mere "store" command, the message will be stored, and the sending equipment will have to search for any stored messages, e.g. when re-attaching to the network. In case of a store-and-forward command, the system is adapted to automatically forward the message to the receiving equipment. This forwarding may e.g. be tried on a periodical basis, or may be performed when detecting that the receiving equipment can be reached again.

The network element providing this storing, or storing-and-forwarding service may be a server such as a proxy server which is already provided as part of existing networks.

In the following, further aspects, features and advantages of the invention will be described with reference to some embodiments as shown in the drawings.

DETAILED DESCRIPTION OF PREFERRED EMBODIMENTS OF THE INVENTION

Figure 1:
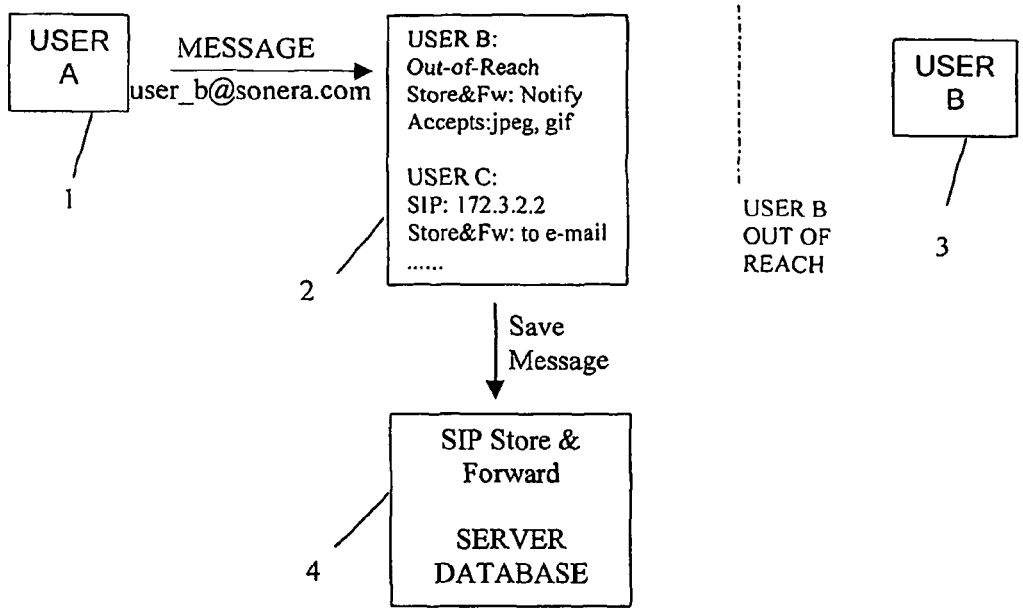
FIGS. 1 and 2 illustrate a preferred embodiment of a communication system in accordance with the invention.

FIG. 1 shows a first embodiment of the invention and illustrates a case where a message is to be sent from a first network element 1 (user A) to a second network element 3 (user B). The network elements 1, 3 are, in the present embodiment, client or user equipments such as terminals. In the present example, the network element 1 (user A) is an equipment, trying to send a message (e.g. "MESSAGE user_b@sonera.com" addressed to user_b@sonera.com) to the receiving element 3 (user B) which is presently out of reach, e.g. switched-off, busy, or located in a non-supported area, or the like. The connection request of network element 1 is handled by a network element 2 which may be a server (such as a proxy server) which provides e.g. CSCF (Call Server Control Function), and/or is a home location server which contains a database storing information on the present locations of network element 3 and further network elements, reachability thereof, and the like.

As shown in FIG. 1, the server 2 stores parameters for several users (user equipments) to be served by server 2. These parameters define the users profiles, network capabilities, and status of the users and terminals. For user B, the server 2 stores the information "out-of-reach"; "store-and-forward: notify"; "accepts: jpeg,gif", etc. This information may be updated by the server 2 or equipment 3 e.g. when re-entering the serving area of server 2, or when equipment 3 wants to change or supplement the types of acceptable messages. The "accepts" field defines the types of acceptable messages. The field "store-and-forward" can be set by equipment 3, or by the operator or service provider of the network to "NO", "YES", "NOTIFY" (when the sending user is to be notified after successful delivery of the message to the user B)", "Forwarding Address or Service for forwarding messages", and the like. The operator or service provider may provide different storing services for different subscribers, such as no storing possibility for normal subscribers, and storing possibility for premium subscribers.

The server 2 furthermore stores e.g. for user C the present IP address "172.3.2.2" for reaching user C, e.g. via SIP.

For user C, the field "store-and-forward" is set to "to e-mail" so as to forward any incoming SIP message to the e-mail address of user C. The server 2 preferably contains further information for users B, C and additional users served by this server.

The network additionally contains a network element such as a server 4 used for storing any SIP message not promptly deliverable to the intended recipient. This server 4 is, in the present embodiment, not only used as a storing server but also as a forwarding server for actively forwarding any stored message to the recipient, e.g. periodically or when receiving information that the recipient is reachable again.

As mentioned above, in the example shown in FIG. 1, the user A is trying to send a message "MESSAGE USER_B@sonera.com" to user B using SIP. The SIP message is handled by server 2 which checks reachability of the recipient user B and detects that user B is presently out of reach. The server 2 then checks the contents of its database field "store-and-forward" set for user B, and detects the condition "notify". Server 2 additionally checks the type of received message which, in the present example, may be a type "jpeg". When this type of message is not comprised in the types mentioned in the field "accepts", the message is discarded. Otherwise, server 2 addresses server 4 for saving the presently undeliverable message received from user A. Hence, the SIP message is stored in the database of server 4 and waiting for later delivery to user B.

Figure 2:
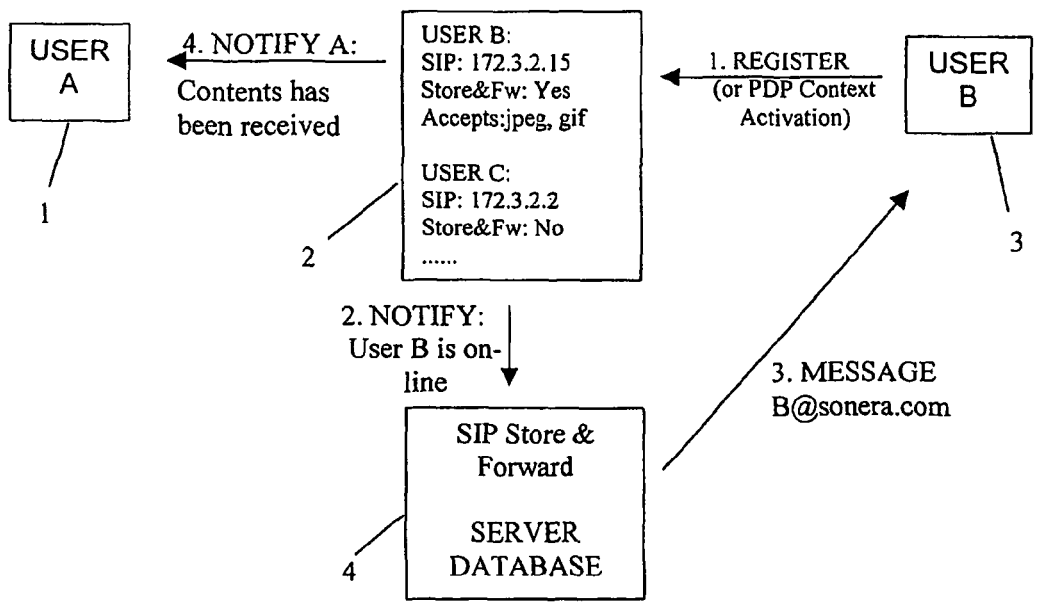
Figure 3:
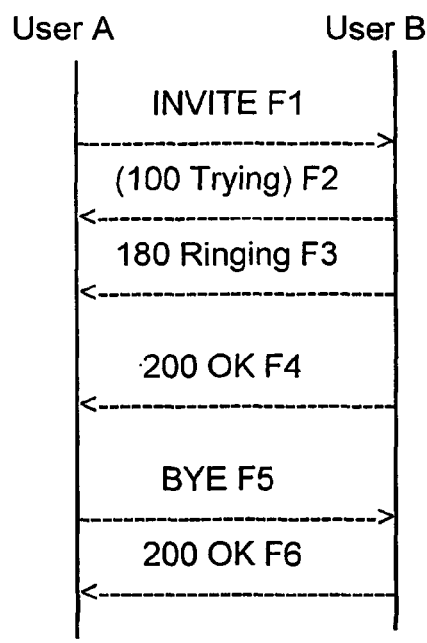
FIG. 3 shows the basic signalling messages between user equipments based on SIP.

FIG. 2 shows the embodiment of FIG. 1 in a condition where the user equipment 3 (user B) can be reached again. When the user equipment 3 can be reached again, it will usually send a message signalling its present state or condition, e.g. its intention to receive access to the network. Such a message is shown in FIG. 2 as step 1.) and may consist in a request "register", "PDP context activation", or the like, depending on the type of network and the like. Such a request is addressed to server 2 which therefore recognises the reachability of equipment 3. When detecting this situation, the server 2 sends, in step 2.) of FIG. 2, a message "notify: user B is on-line" to server 4. The server 4 checks its database with regard to any waiting message or messages stored for user B. When detecting such messages, the server 4 sends this message or messages directly to user equipment 3 as shown in step 3.), "MESSAGE USER_B@sonera.com". The server 4 may also be adapted to send a confirmation to server 2 after successful transmission of the stored messages to user equipment 3. The server 2 then preferably sends, in step 4.), a message to user equipment 1 informing the latter on successful delivery of the message to user equipment 3. This message is shown in FIG. 2 as "NOTIFY A: contents has been received".

Furthermore, the server 2 changes the conditions set for user B from "out of reach" to e.g. the address of user B, and/or the field "store-and-forward" to "YES". In the latter case, any message received for user B during subsequent unreachability thereof will simply be stored and forwarded after later reachability of user B, without sending any "notify" message to user A such as shown in step 4.) of FIG. 2.

As illustrated in FIG. 2, the server 2 may meanwhile also have changed the contents of the fields for user C from "to e-mail" (FIG. 1) to "NO" based on information received from the equipment of user C or the network operator or service provider.

The present invention therefore guarantees that the message contents (e.g. image or audio contents) of a SIP message is delivered to the receiver even if the receiver should be presently out of reach or occupied. For achieving this function, the invention defines an extension to the syntax of a connection protocol such as SIP which allows the sender to define whether or not the message should be temporarily stored when the receiver should presently be out of reach, and should be sent to the receiver as soon as possible. This local temporary storage of the message is performed taking account of the present status of the receiver. The storing place may be defined by the sender by adding a storing place address to the message. The storing place may also be defined by the serving server 2.

The standardisation drafts for SIP define that there may be a "request-disposition" header to specify caller preferences for the way how a server such as server 2 should process a request. The header can include the following items:
Request-disposition="Request-disposition" ":"
  1# (proxy-feature | cancel-feature |
  fork-feature | recurse-feature |
  parallel-feature | queue-feature |ring-feature)
proxy-feature="proxy" | "redirect"
cancel-feature="cancel" | "no-cancel"
fork-feature="fork" | "no-fork"
recurse-feature="recurse" | "no-recurse"
parallel-feature="parallel" | "sequential"
queue-feature="queue" | "no-queue"
ring-feature="ring" | "no-ring"

The invention extends this header to specify also "do-no-tore" and "store-and-forward-if-not-reached", and the like.

"Do-no-tore" means that this message should not be stored (e.g. it is instant in nature). "Store-and-forward-if-not-reached" means that this message should be stored, in a place defined by the sender, since it is important. E.g. if receiver was out-of-reach, this message is stored temporarily and sent to the receiver afterwards, as soon as possible. Usually local proxy (or e.g. yahoo like of proxy) will be the storing place. That proxy will be subscribed to presence status service and waits for a receiver to become on-line. When the receiver becomes on-line, the proxy gets a notification, and sends the message to the receiver. After 200 OK message, the proxy also (optionally) notifies the original sender that "Message has been delivered", using SIP NOTIFY method.

The above-described implementation ensures correct delivery to the receiver as soon as same is reachable again, e.g. after re-attaching to the network or terminating any ongoing call.

Figure 4:
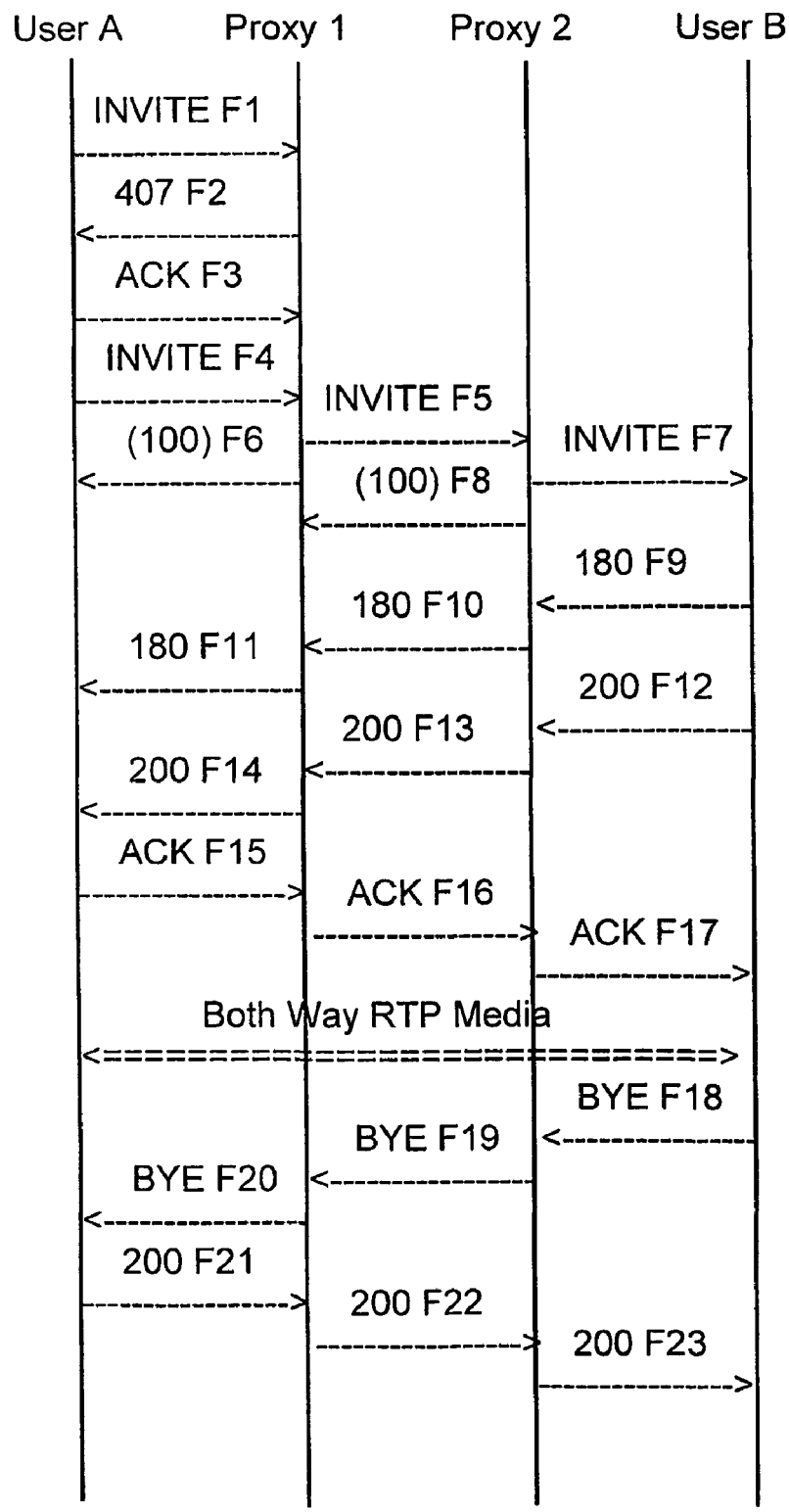
FIGS. 4 and 5 show further examples of successful SIP to SIP messaging using two proxy servers.

FIG. 4 shows a basic example of a SIP call performed when trying to establish a bi-directional media connection "Both way RTP media". The example of FIG. 4 shows a successful SIP to SIP connection between users A and B through two proxy servers, proxy 1 and proxy 2. The numbering F1 to F23 attached to the steps of FIG. 4 indicate the flow sequence whereas the words or numbers in front of this step numbering are in line with the definition of the SIP protocol. As the message flow and sequence steps of FIG. 4 are self-explanatory, no more detailed description is necessary.

When, in accordance with the above-described embodiments, SIP is used for messaging, no "both way RTP media" is set-up. The flow may therefore proceed, in accordance with one embodiment of the present invention, as shown in FIG. 5.

There are several flow possibilities to achieve SIP-based messaging.

Figure 5:
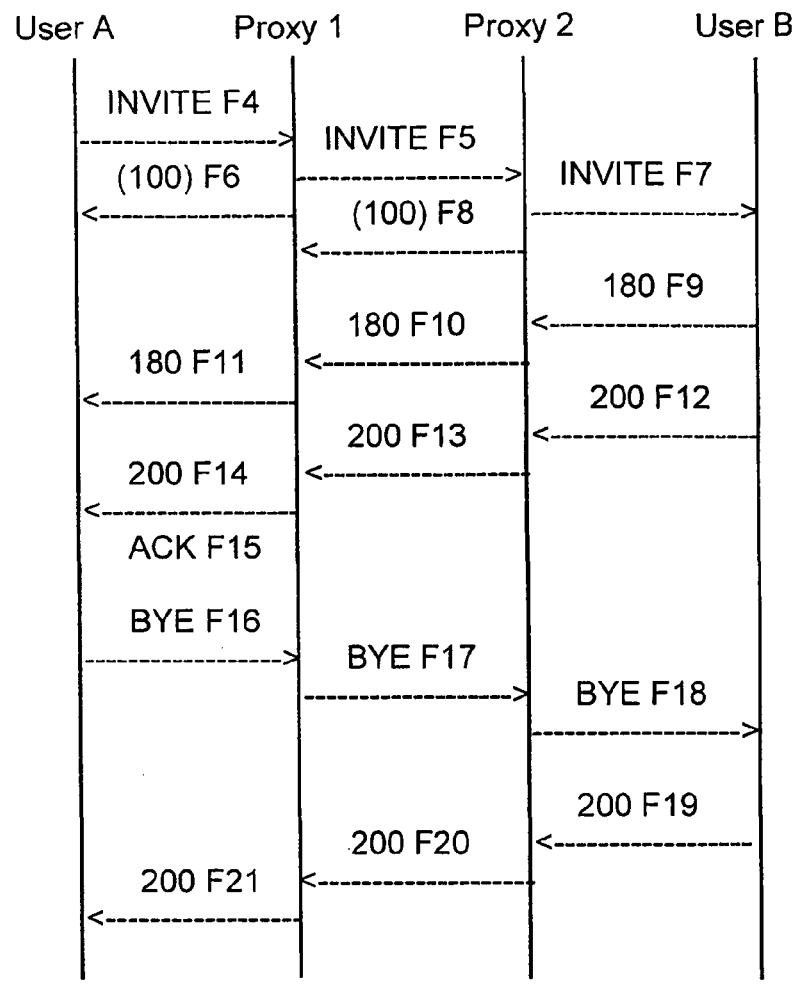

The INVITE request message sent in step F4 of FIG. 5 contains the message payload (MIME types) sent from user A to user B.

In the following, one example of the INVITE request from user A to proxy 1 is shown:

```
F4 INVITE A –> Proxy 1
  INVITE sip:UserB@ss1.wcom.com SIP/2.0
  Via: SIP/2.0/UDP here.com:5060
  From: BigGuy <sip:UserA@here.com>
  To: LittleGuy <sip:UserB@there.com>
  Call-ID: 12345601@here.com
  CSeq: 1 INVITE
  Contact: BigGuy <sip:UserA@here.com>
  Authorization:Digest username="UserA", realm="MCI
WorldCom SIP",
  nonce="wf84flceczx41ae6cbe5aea9c8e88d359", opaque=" ",
  uri="sip:ss1.wcom.com",
    response="42ce3cef44b22f50c6a6071bc8"
  Content-Type: multipart/mixed;
    boundary=gc0pJq0M:08jU534c0p
  Content-Length: 147
  v=0
  o=UserA 2890844526 2890844526 IN IP4 here.com
  s=Session SDP
  c=IN IP4 100.101.102.103
  t=0 0
```

```
m=audio 49170 RTP/AVP 0
a=rtpmap:0 PCMU/8000
------__=__NextPart__gc0pJq0M:08jU534c0p
Content-Type: image/jpeg; charset="iso-8859-1"
R0lGODlhuQEFAfAAAAAAAP///yH5BAEAAAEALAAAAAC5AQUBAAL+jI+py+0
P4wKUyouz3rz7D4biSJZmUAEnl7ZW5lbrTNf2jec6FrvKC+sJhz0IMcWQ7Z
bMpvO5U0lRVKn1iM1qt9wuFwoOi8dkr/mMTqu35Lb7DRet5/S6nRjP6/d8w
/0PGOjVR1hoyCSYqLgIdOj4CBnCOElJF3mJmRlRydn5pQkamnnlWWqqJJqq
anjaaroKG5vnS1spe4tbVrsrmOv7+8QrXAdcbIwzNaw8eNzsvLQcjfRMXW0jvWytvW1C
```

If there is more than one payload in SIP, then multiparty MIME is used, as shown in the above example (Content-Type: multipart/mixed; boundary=gc0pJq0M: 08jU534c0p). In the payload itself there are different MIME-types, separated by boundary.

If user B is not reachable then the immediate sending fails.

In order to have a store and forward service in accordance with the invention, several possibilities are described below.

1. Using the SIP forward capabilities:

User B has a "forwarding on not reachable" activated at proxy 2 (which may correspond to server 2 of FIGS. 1, 2). If User B can not be reached by proxy 2 then the proxy 2 forwards the message to the user's B "ghost user agent" B2, which can be a "connected" device which is always reachable/online, such as server 4. Then user agent B2 periodically tries to forward the message (using the same SIP based messaging capabilities) to the User agent B of the user B. The periodical forwarding timer can be of any kind. It may also be provided that the user agent B2 tries to forward the message only for a certain time and then discards it.

2. Forwarding the message payload to the user's B e-mail address:

If user B is not reachable by the proxy 2, then proxy 2 transfers the message payload (MIME type) to the user's B e-mail address (e.g. with SMTP) which may be specified in the INVITE message or which may be contained in a user profile option used by proxy 2.

3. Forward to MMS server:

Same as in 2, but the message payload (MIME types) is forwarded to a MMS server. MMS stands for Multimedia Messaging Service as defined in 3GPP 22.140 and 23.140. The message is delivered when user B becomes reachable by the MMS server. This can be part of the user's B profile.

4. Forward to SMSC:

Same as in 2, but the text part of the message (MIME type TXT) is forwarded to the SMSC (Short Message Service Centre). The message is delivered when user B becomes reachable by the SMSC. This may be also part of the user's B profile.

Figure 6:
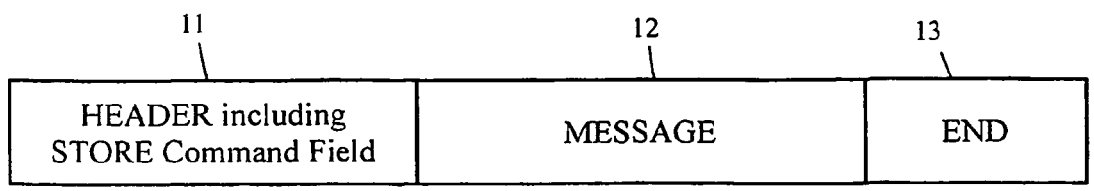
FIG. 6 illustrates the basic structure of a protocol word adapted in accordance with one implementation of the invention (based on SIP)

FIG. 6 shows an example of a basic structure of a SIP protocol word adapted in accordance with the present invention. The protocol word contains a header 11 which, in accordance with the invention, includes a "store command" field (as part of the protocol word). The "store command" field represents or includes an identifier which may be set, by the sender of the message, to the settings "store", "store-and-forward", "notify", or "do not store". The protocol word furthermore contains a message portion 12 containing a message e.g. of MIME type, and the usual end field 13.

In this example, a SIP INVITE message is used for carrying the payload, wherein the payload is inserted into the MIME field 12. When the receiving user B has activated "forwarding on not reachable" in his/her proxy server 2, the proxy server 2 will forward any received SIP message to a network element such as network element 4 (ghost user agent) which is a device always connected to the proxy server. The proxy server 2, or the server 4 may be adapted to periodically try to forward any stored message (using SIP) to the user equipment 3. A maximum lifetime period can be defined for undelivered messages saved in the storing network element such as server 4. Upon expiry of the lifetime period, stored undelivered messages will be cancelled.

As discussed above, the message payload may also be re-addressed to another address when the receiving user should not be reachable or occupied or the like, and may be addressed e.g. to the e-mail address (see the parameters stored for user C in FIG. 1), a MMS server, a SMSC, or the like.

Figure 7:
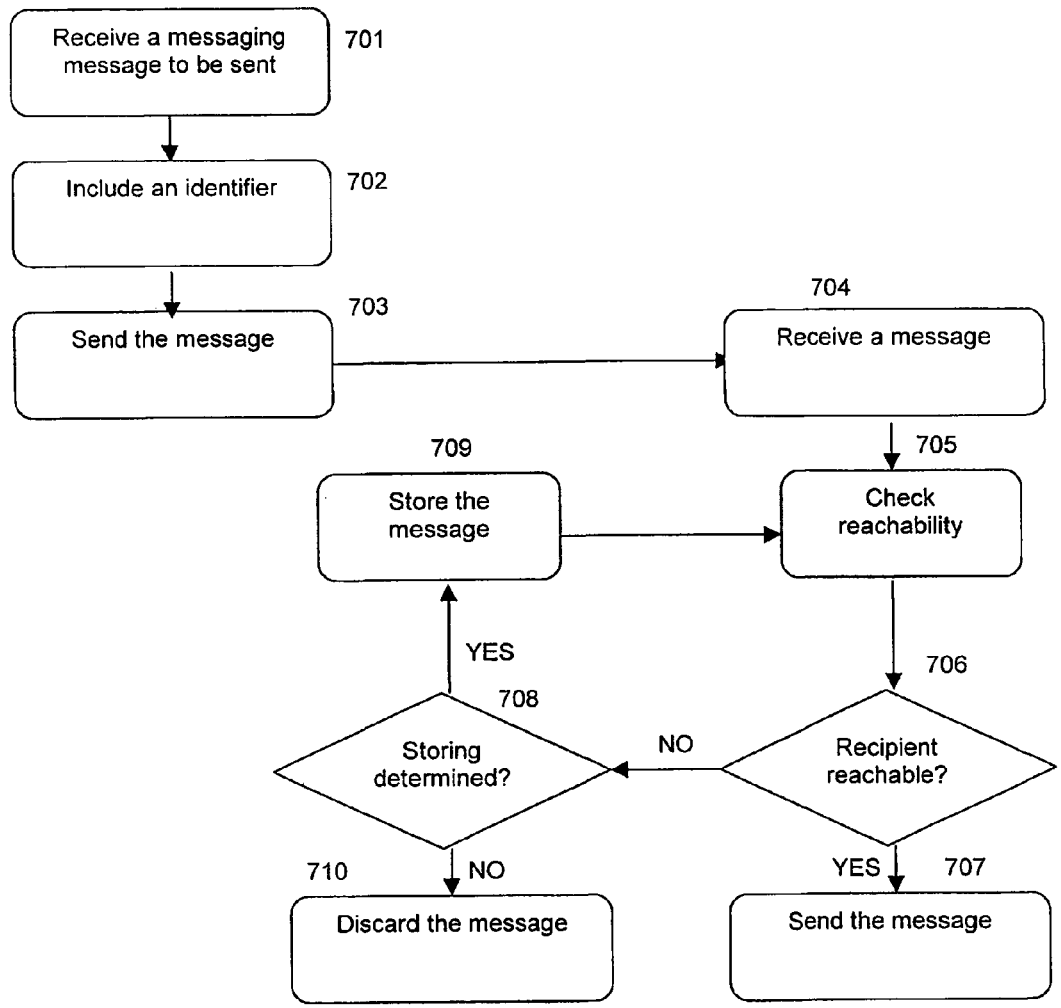
FIG. 7 shows a flow diagram illustrating an embodiment of a method according to the invention.

FIG. 7 shows a flow chart illustrating method steps executed in an embodiment of the invention. Steps 701 to 703 may be executed in a sender which may be the user equipment 1 of user A. In step 701, a messaging (i.e. no signalling) message to be sent is received which message may be input by a user via a terminal such as keyboard, digital camera and the like. On some embodiments message is received from another network element such as a messaging gateway acting as a gateway between the messaging system of the SIP based network and the WAP service centers connected to the GSM network. An identifier is included into, or added to, the message in step 702. The message and the identifier may be included into a protocol word such as SIP. Thereafter the message is sent in step 703. The sent message will be received, in step 704, by the addressed network element such as server 2 of FIGS. 1, 2.

The reachability of the recipient indicated in the message or transmitting protocol is checked in steps 705 and 706. When the recipient is reachable, the message is sent to the recipient in step 707. When, to the contrary, the recipient is presently not reachable, e.g. busy or de-attached from the network, the process proceeds to step 708 where the identifier of the received message is checked in order to decide on the temporary storing (step 709) of the message in an internal or external memory, e.g. in server 4, or immediate discarding of the message (step 710), depending on the status of the identifier. The status of the identifier may e.g. have the value "00" for storing, "11" for discarding, "01" for "Notify sender after delivery to the Recipient", and the like.

When a message is stored, the step 705 may be repeatedly executed until reachability of the sender is detected. The step 705 may additionally or alternatively be triggered e.g. when the recipient attaches again to the network. When reachability is found, the stored message is read out of the memory, and is sent to the recipient, e.g. from server 4 or 2.

Figure 8:
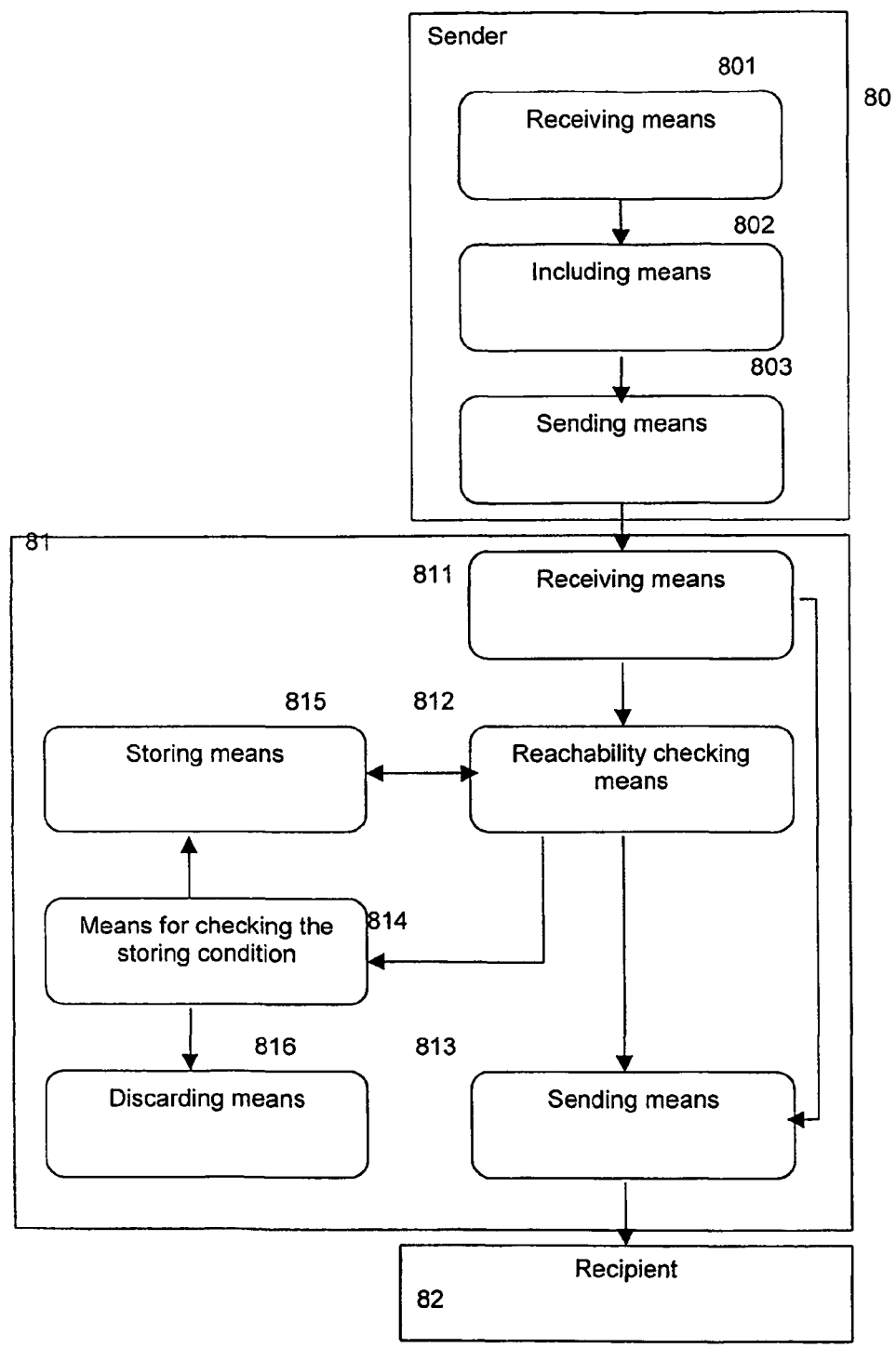
FIG. 8 shows a block diagram of an embodiment of a system in accordance with the invention.

FIG. 8 shows a block diagram of network elements of an embodiment of a system according to the invention. A sender 80 includes a receiving means 801 for receiving a messaging (i.e. no signalling) message (user traffic) to be sent, and is adapted to execute step 701 of FIG. 7. The message may be input via a terminal such as keyboard, digital camera and the like, or from another network element. The sender 80 further comprises an including means 802 for adding, or including, an identifier into the message, and eventually including the message into one or more protocol words of a messaging enabling protocol such as SIP, so as to carry out step 702. A sending means 803 is adapted to execute step 703, i.e. to send the protocol word(s) including the message and the identifier to a serving network element 81 such as server 2.

The serving network element 81 is adapted to carry out the steps 704 to 710 shown in FIG. 7. The serving network element comprises a receiving means 811 for receiving messages, e.g. the protocol word(s) sent from sender 80, and a reachability checking means 812 which checks whether the intended recipient 82 can be accessed so that the message can be promptly delivered to the intended recipient 82. If yes, the message is sent to a sending means 813 of the serving network element 81. The sending means 813 sends the message to the indicated receiving address, i.e. to the recipient 82.

When the checking means 812 detects that the recipient 81 can presently not be reached, it transfers the message to a checking means 814 which is adapted to check whether the message is to be stored or discarded. The checking means 814 performs this check by examining the identifier included in the message or protocol word. When the identifier does not command a storing of the message, the message is discarded by a discarding means 816 which e.g. actively deletes the message or simply inhibits a storing thereof. Otherwise, when the identifier commands the storing of the message if not promptly deliverable, the checking means 814 sends the message to a storing means 815 which may be an internal memory or an external storage such as in server 4.

When the checking means 812 subsequently detects that the recipient 81 may be reached again, it either retrieves the stored message from the storing means 815 and transfers the message to the sending means 813, or instructs the storing means 815 to transmit the message to the recipient 81 via other means, e.g. server 4.

According to one embodiment of the invention, the header 11, in particular, the Request-Disposition part, of the SIP protocol word is newly defined so as to include an identifier, preferably the protocol portion "store command field" which may contain the commands "do-no-tore" or "store-and-forward-if-not-reached" according to the setting of user A. The first header "do-no-tore" informs the system that the message is of instant nature and is to be discarded instantly if it cannot be promptly delivered. The latter header "store-and-forward-if-not-reached" means that the message should be stored (usually in the local proxy or another storage) and forwarded, if the receiving equipment is presently unreachable or occupied, or the like. The proxy will be subscribed to a present status service for being informed on the presence status, and will wait for the receiver to become on-line. As shown in FIG. 2, the proxy server 2 is adapted to send a notification (step 4) to the original sender 1 using SIP NOTIFY method, after the delivery of the message to the user B (200 OK message).

When the receiving user B is becoming on-line again, the network recognises this situation, e.g. by receiving a SIP REGISTER message or PDP-context activation request. The CSCF and home location server 2 inform the SIP store and forward server 4 about this situation, either using a SIP protocol or any other protocol. The servers 2 and 4 may be also be co-located inside the same machine.

Although preferred embodiments of the invention have been described above, the invention is not limited to the details thereof. Instead of SIP protocol, any other instant messaging protocol can be used provided it is no specific protocol intended only for messaging service but a protocol primarily intended for establishment of connection between two (or more) terminals.

The invention claimed is:

1. A method, comprising:
storing at least one parameter defining a temporary storage of at least one instant message for delivery to a terminal, wherein the temporary storage is specified by including an address of a storage location with the instant message,
receiving parameter setting information from the terminal,
setting or updating, via at least one processor, the at least one parameter depending on the parameter setting information,
receiving an instant message addressed to the terminal,
checking, via the at least one processor, if a user of the terminal is reachable, and
if the user of the terminal is determined to not be reachable, treating the received instant message according to the at least one parameter, and
initiating transmittal of a delivery report indicating successful delivery of the received instant message if the delivery of the received instant message to the terminal is successful.

2. The method of claim 1, wherein the temporary storage includes one of storing, non-storing, or store-and-forwarding of the at least one instant message for the terminal.

3. The method of claim 1, wherein the parameter setting information defines a setting of a store and forward field in a server.

4. The method of claim 1, wherein the parameter setting information indicates at least one type of acceptable instant messages.

5. The method of claim 1, further comprising:
sending the instant message by a session initiation protocol.

6. The method of claim 1, further comprising in response to determining that the user of the terminal is not reachable, detecting when the user of the terminal becomes reachable.

7. The method of claim 6, where detecting comprises detecting if another message is received that signals a present state or condition of the terminal.

8. The method of claim 6, where in response to detecting that the user of the terminal becomes reachable, sending the received instant message to the terminal.

9. The method of claim 1, where if the user of the terminal is determined to not be reachable, forwarding the received instant message to a destination other than the terminal.

10. The method of claim 1, where the at least one parameter specifies to forward the received instant message if the user of the terminal is determined to not be reachable.

11. The method of claim 10, where at least a part of the received instant message is forwarded to one of a server that periodically attempts to send the received instant message to the user of the terminal, or to an electronic mail address of the user of the terminal, or to a multimedia messaging service server, or to a short message service center.

12. The method of claim 1, wherein the delivery report is delivered via the same protocol used to deliver the received instant message.

13. A method, comprising:
initiating, via at least one processor, to send parameter setting information, and then sending the parameter setting information, for setting or updating at least one parameter of a server, the at least one parameter defining a treatment of at least one instant message, the treatment comprising a temporary storage of the at least one instant message, for delivery to a terminal, and wherein the temporary storage is specified by including an address of a storage location with the instant message, receiving at least one instant message from the server, where
the at least one parameter defines the treatment to be applied when a user of the terminal to which the received instant message is addressed is determined to not be reachable to receive the at least one instant message, and
initiating to send a delivery report indicating successful delivery of the received instant message if the delivery of the received instant message to the terminal is successful.

14. The method of claim 13, where the at least one parameter defines storing, non-storing, or store-and-forwarding of the at least one instant message.

15. The method of claim 13, further comprising sending a message to signal to the server a present state or condition of the terminal and to indicate that the terminal is reachable, thereby causing the receiving of the at least one instant message.

16. The method of claim 13, wherein in response to the user of the terminal not being reachable, further comprising receiving at least a part of the received instant message that is forwarded from one of a server that periodically attempts to send the received instant message to the user of the terminal, or from an electronic mail server, or from a multimedia messaging service server, or from a short message service center.

17. The method of claim 13, further comprising the steps of initiating to send a second instant message, and
receiving a delivery report indicating whether the delivery of the second instant message was successful.

18. An apparatus, comprising:
a processor; and
a memory that stores software executable by the processor, where execution of the software by the processor causes the apparatus to
receive at least one instant message,
send parameter setting information for setting or updating at least one parameter in a server, the at least one parameter defining a treatment of instant messages for the apparatus, the treatment comprising a temporary storage of the at least one instant message, for delivery to a terminal, and wherein the temporary storage is specified by including an address of a storage location with the instant message, where
the at least one parameter defining the treatment to be applied when a user of a terminal to which the instant message is addressed is determined to not be reachable to receive the at least one instant message, wherein the at least one parameter defines that the instant message is temporarily stored until the user becomes reachable,
indicate when the user becomes reachable, and
receive the stored instant message upon indication that the user has become reachable.

19. The apparatus of claim 18, wherein the temporary storage includes one of storing, non-storing, or store-and-forwarding of at least one instant message.

20. The apparatus of claim 18, wherein the parameter setting information indicates one or more types of acceptable instant messages.

21. An apparatus, comprising:
a processor; and
a memory that stores software executable by the processor, where execution of the software by the processor causes the apparatus to
determine to receive, from a terminal, parameter setting information for setting or updating at least one parameter in the apparatus, the at least one parameter defining a treatment of instant messages for the terminal, the treatment comprising a temporary storage of the instant messages, for delivery to the terminal, and wherein the temporary storage is specified by including an address of a storage location with the instant messages,
determine to receive an instant message addressed for delivery to the terminal,
determine to check if a user of the terminal is reachable, and
if the user of the terminal is determined to not be reachable, treating the received instant message according to the at least one parameter, and
determine to send a delivery report indicating successful delivery of the received instant message if the delivery of the instant message to the terminal is successful.

22. The apparatus of claim 21, wherein the at least one parameter defines storing, non-storing, or store-and-forwarding of instant messages for the terminal.

23. The apparatus of claim 21, wherein the parameter setting information indicates one or more types of acceptable instant messages.

24. The apparatus of claim 21, wherein the apparatus is configured to send or receive at least one instant message using a session initiation protocol.

25. A non-transitory computer-readable medium encoded with instructions that, when executed on a computer, perform a process, the process comprising:
storing at least one parameter defining a treatment of at least one instant message for a terminal, a temporary storage of the at least one instant message, for delivery to a terminal, and wherein the temporary storage is specified by including an address of a storage location with the instant message,
receiving parameter setting information from the terminal,
setting or updating the at least one parameter depending on the parameter setting information,
receiving an instant message addressed for delivery to the terminal,
checking if a user of the terminal is reachable, and
if the user of the terminal is determined to not be reachable, treating the received instant message according to the at least one parameter, and
initiating to send a delivery report indicating successful delivery of the received instant message if the delivery of the received instant message to the terminal is successful.

26. The computer-readable medium of claim 25, the parameter defines storing, non-storing, or store-and-forwarding of the at least one instant message for the terminal.

27. The computer-readable medium of claim 25, wherein the parameter setting information defines a setting of a store and forward field in a server.

28. The computer-readable medium of claim 25, wherein the parameter setting information indicates one or more types of acceptable instant messages.

29. The computer-readable medium of claim 25, the process further comprising:
sending the instant message by a session initiation protocol.

30. A non-transitory computer-readable medium encoded with instructions that, when executed on a computer, perform a process, the process comprising:
sending parameter setting information for setting or updating at least one parameter of a server, the at least one parameter defining a treatment of at least one instant message, the treatment comprising a temporary storage of the at least one instant message, for delivery to a terminal, and wherein the temporary storage is specified by including an address of a storage location with the message, receiving at least one instant message from the server, where the at least one parameter defines the treatment to be applied when a user of the terminal to which the received instant message is addressed for delivery is determined to not be reachable to receive the at least one instant message, and initiating to send a delivery report indicating successful delivery of the received instant message if the delivery of the received instant message to the terminal is successful.

* * * * *